United States Patent [19]

Teysseyre et al.

[11] 4,069,576
[45] Jan. 24, 1978

[54] WOUND WIRE REINFORCING BANDS AND METHOD

[75] Inventors: Pierre Teysseyre, Villejuif; Joël Vigneau, Evry, both of France

[73] Assignee: Societe Nationale d'Etude et de Construction de Moteurs d'Aviation, Paris, France

[21] Appl. No.: 620,356

[22] Filed: Oct. 7, 1975

[30] Foreign Application Priority Data

Oct. 30, 1974 France .............................. 74 36209

[51] Int. Cl.$^2$ ........................................... B22D 11/126
[52] U.S. Cl. .............................. 29/527.2; 29/401 A; 164/120
[58] Field of Search .................... 29/401 A–401 F, 29/148.4 D, 527.2, 527.6 US; 164/120, 108 US, 80, 72, 132

[56] References Cited

U.S. PATENT DOCUMENTS

| 2,166,109 | 7/1939 | karmazin | 29/DIG. 12 |
| 2,544,455 | 3/1951 | Goulding | 29/148.4 D |
| 3,006,064 | 10/1961 | Watson | 29/401 |
| 3,006,065 | 10/1961 | Watson | 29/401 X |
| 3,007,231 | 11/1961 | Garver | 29/401;148.4 D |
| 3,343,955 | 9/1967 | Talmage | 29/420.5 X |
| 3,530,564 | 9/1970 | Cullen | 29/401 |
| 3,633,259 | 1/1972 | Nikanen | 29/148.4 D |

Primary Examiner—C.W. Lanham
Assistant Examiner—V. Rising
Attorney, Agent, or Firm—Bacon & Thomas

[57] ABSTRACT

A method and apparatus for fabricating reinforcing bands for strengthening parts to be subjected to high centrifugal stresses. The reinforcing bands are made of coiled wire with a high modulus of elasticity and with a matrix of light metal or light-metal alloy. The coil, hoop or blank so formed is compacted in a direction parallel to its axis under high pressure and heat by an annular metal ram in a mold or die consisting of a bottom member, an inner ring, and an outer ring which are constructed so that the blank or coil does not undergo any radial stresses.

8 Claims, 1 Drawing Figure

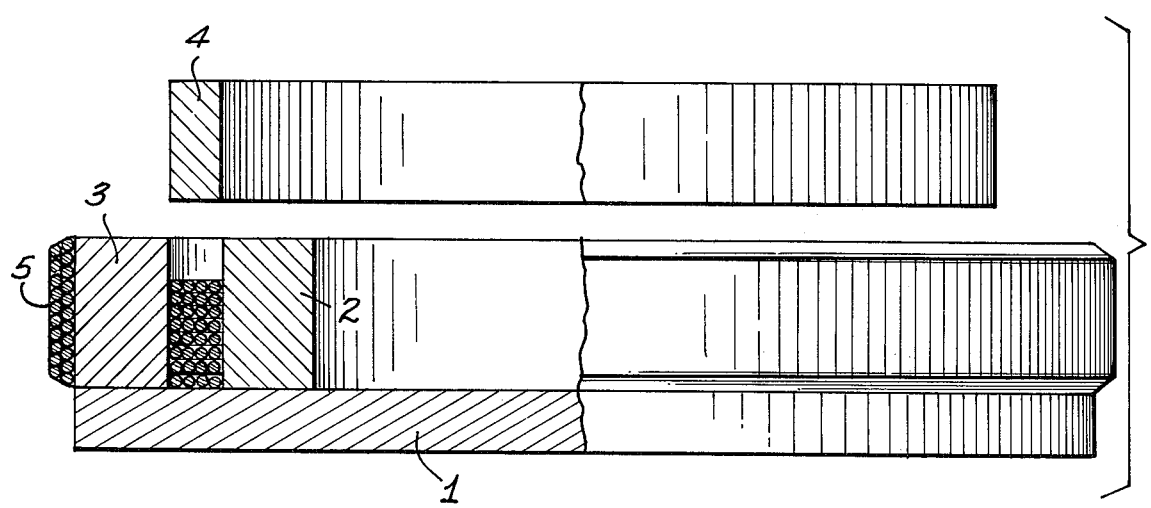

WOUND WIRE REINFORCING BANDS AND METHOD

BACKGROUND

1. Field of the Invention

This invention concerns a process and apparatus for manufacturing wound wire reinforcing bands and the product so obtained.

2. Description of the Prior Art

The high mechanical strength of boron or silicon carbide wire suggests utilizing such wire for fabricating bandlike reinforcing memebers intended for strengthening high-speed rotating parts or components subjected to high centrifugal stresses. Such reinforcing bands are made by coiling the wires and joining them to each other by means of a metallic matrix preferably consisting of light metal or a light metal alloy such as aluminum.

SUMMARY OF THE INVENTION

A new process and apparatus is here disclosed for producing such band-like reinforcing members. According to the invention, the high-strength wire is spirally wound on a mandrel and is covered by a foil of light metal, the wire being spaced at intervals of between 0.3 and 2.0 "$d$" ($d$ being the diameter of the wire). The material used as matrix is then deposited on the single layer of wire obtained as above. This procedure is then repeated as many times as desired. Finally, the blank so formed is subjected to high pressure and heat in a mold wherein the direction of such pressure is parallel to the axis of the blank.

BRIEF DESCRIPTION OF THE DRAWING

The drawing shows a view, partly in section and partly in side elevation, of the device for carrying out the process of the invention and the product thereby in a certain stage of formation.

DETAILED DESCRIPTION

To facilitate understanding of the invention, a specific example is given below, but the invention, of course, is not restricted in any way to this example.

The present example relates to the fabrication of a reinforcing band according to the invention wherein a tungsten core coated with silicon carbide is used as coil wire and wherein aluminum is used as matrix. The finished band is then obtained by use of high pressure in a power press as shown in part in the drawing.

The wire utilized as the starting material has a diameter of about 0.100 mm. This wire is wound on a mandrel (outer diameter 146 mm) and covered by aluminum foil in such manner that the spacing between each wire is about 0.100 mm. By means of a plasma torch, the aluminum used as matrix is projected on the single layer of wire, and the quantity of aluminum is such that it completely covers the coil of wire and forms a continuous aluminum surface.

This surface is suitably finished to provide a nearly plane surface on which a new layer of wire is coiled at the same pitch as the first layer. Then, another matrix of aluminum is again welded to the second layer.

This results finally in a coil or blank of 18 successive layers of wire with an approximate thickness of 2.85 mm. The volume of the blank consists of 64% aluminum, 20% wire and 16% "voids". The blank is then subjected to high pressure by being placed in a mold (shown in the attached sheet of drawing). The mold includes:
- a bottom member 1;
- an inner ring 2;
- an outer ring 3, which defines, together with ring 2, an annular space in which the blank is inserted; and
- a metal ram 4, which enters the top of the annular space and which exerts high pressure on the blank.

The mold is then heated to such a temperature that the matrix, under the influence of the ram pressure creeps into and fills the voids in the blank. When the matrix is of aluminum, as it is in this example, the press may be operated at 500° C and a pressure of $40 \times 10^3$ "kPa" or 600° C at a pressure of $3 \times 10^3$ "kPa". It is generally preferable to work at a relatively low temperature in order to avoid degrading the matrix (e.g., by oxidation).

During the above compaction of the blank, there occurs simultaneously "creepage" of the matrix into the voids of the blank and a shrinkage of the spirals of the wire. Such shrinkage, however, should not be too great, and, in any event, the spacing of the spirals must not be less than 0.2 "$d$", where $d$ is the diameter of the wire.

It must be kept in mind that the only stress exerted on the blank must be the stress in a direction parallel to the axis of the coil (i.e., parallel to the layers of the wire spirals). Specifically, it is necessary to prevent any radial stress which might develop (e.g., during heating and/or cooling of the mold containing the blank).

Consequently, the coefficients of expansion of the several components of the mold must be selected as a function of the coefficients of expansion of the blank. For example, when the coefficient of expansion of the blank in the example above is $6.5 \times 10^{-6}$, steel with a coefficient of expansion of $14.2 \times 10^{-6}$ may be employed for the inner ring 2, and graphite with a coefficient of expansion of $4 \times 10^{-6}$ may be employed for the outer ring 3 of the mold. Considering that the mechanical strength of graphite may be insufficient, it is preferable to strengthen this part of the mold itself by way of a reinforcing band as is shown by reference numeral 5 in the drawing.

After compaction, there results a finished reinforcing band, totally compacted, in which the voids now represent a volume of less than 0.1%.

The detailed example above provides an understanding of the process, apparatus, and product as well as their particular features, but it is not in any way intended to be restrictive.

Numerous recently developed materials may be used such as tungsten wire coated with boron or silicon carbide, boron nitride, or with more than one of these materials. Such wire generally has a diameter between 0.075 and 0.200 mm.

The layers are coiled layer after layer with a pitch such that the spacing of the wires is between 0.3 and 2.0 times the diameter of the wire. In the example, each layer has the same spiral pitch as the next layer, but this is not necessary. According to the invention, it is possible to produce windings where each layer has a different spiral pitch.

The metal used as matrix must be compatible with the coating substance of the wire and will be a light metal or a light-metal alloy. In the example described above, the matrix is deposited on the wire coils preferably by means of a plasma torch. However, it is also possible to place aluminum foil as the matrix around each layer of spirals.

In the example given, the blank has voids of 16% of the entire volume before compaction. It is obvious that the percentage of voids of the blank will vary as a function of a) the material used as the matrix, b) the conditions under which the matrix is applied, and c) the manner of application of the matrix. The percentage of voids of the blank may therefore vary between about 15% and 25%.

The reinforcing bands produced in accordance with the invention have the special advantage that the strands do not undergo radial stresses at any time (i.e., along a radius of the band).

Only the electrolytic process of depositing the matrix permits the fabrication of reinforcing members with similar properties. However, with electrolysis, it is not possible to use other than pure aluminum or, at most, a binary alloy as the matrix.

Consequently, the method according to the invention is much more flexible, and this method makes it possible to obtain new materials due to a larger choice among available matrix substances.

The reinforcing bands according to the invention have the form of a torus with rectangular cross section and may have a number of possible uses, as, for example:
- drums, disks, shafts;
- parts of ultracentrifuges;
- flywheels; and, in general, as reinforcing bands for all parts and components subjected to very high centrifugal forces.

We claim:

1. A process for fabricating a ring shaped member to be used in high speed rotating machinery which is subject to high centrifical stresses, the process comprising the steps of:
  a. winding wire helically on a mandrel to form a single cylindrical layer of wire, each wind being spaced between 0.3 and 2.0 $d$ from the next adjacent wind, $d$ being the diameter of the wire;
  b. depositing matrix material on the layer of wound wire after said winding step;
  c. repeating said winding and depositing steps $n-1$ times, where $n$ is the number of layers of wire in the finished product, each repeated winding step providing a single layer of wire over the same axial length as the first layer of wire; said repeated winding and depositing steps forming an annular blank;
  d. applying heat and pressure to said blank, said pressure being applied parallel to the axis of rotation of the annular blank and being applied so that no radial stresses occur in the blank, said heat and pressure being selected so that the matrix creeps into and fills the interstices between the wires while the integrity of the wound wire is maintained.

2. A process as defined in claim 1 wherein the inner diameter of the annular blank is substantially determined by the outer diameter of the mandrel.

3. A process as defined in claim 1 wherein the volume of matrix material deposited during said depositing step is approximately three times the volume of the layer of wire wound during the immediately preceding winding step.

4. A process as defined in claim 1 wherein said blank, prior to said step of applying heat and pressure, is placed in an annular space defined by a mold, and wherein said pressure applying step is carried out by an annular ram which cooperates with the annular space of the mold to apply pressure throughout the blank.

5. A process as defined in claim 4, wherein said mold includes an inner ring and an outer ring, the coefficient of expansion of the inner ring being greater than that of the blank and the coefficient of expansion of the outer ring being less than that of the blank.

6. A process as defined in claim 1, wherein the matrix material is deposited by a plasma torch and wherein the matrix surface is suitably finished after each deposit.

7. A process as defined in claim 1 wherein said wire is composed of tungsten coated with a material selected from a group consisting of boron carbide, silicon carbide, boron nitride, or combinations thereof, and wherein the diameter of the wire is in the range of 0.075 mm – 0.200 mm.

8. A ring-shaped reinforcing band for use in high speed rotating machinery which is subject to high centrifugal stresses, the band being produced by:
  a. winding wire helically on a mandrel to form a single cylindrical layer of wire, each wind being spaced apart between 0.3 and 2.0 $d$ from the next adjacent wind, $d$ being the diameter of the wire;
  b. depositing matrix material on the layer of wound wire after said depositing step;
  c. repeating said winding and depositing steps $n$-1 times, where $n$ is the number of layers of wire in the finished product, each repeated winding step providing a single layer of wire over the same axial length as the first layer of wire; said repeated winding and depositing steps forming an annular blank;
  d. applying heat and pressure to said blank, said pressure being applied parallel to the axis of rotation of the annular blank, said heat and pressure being selected so that the matrix creeps into and fills the interstices between the wires while the integrity of the wound wire is maintained;
  e. whereby a reinforcing ring is produced wherein the reinforcing wires have been substantially free of any radial stresses at all times during production of the band.

* * * * *